No. 738,010. PATENTED SEPT. 1, 1903.
E. P. DIGNAN.
METAL WHEEL NAVE.
APPLICATION FILED DEC. 28, 1901.
NO MODEL
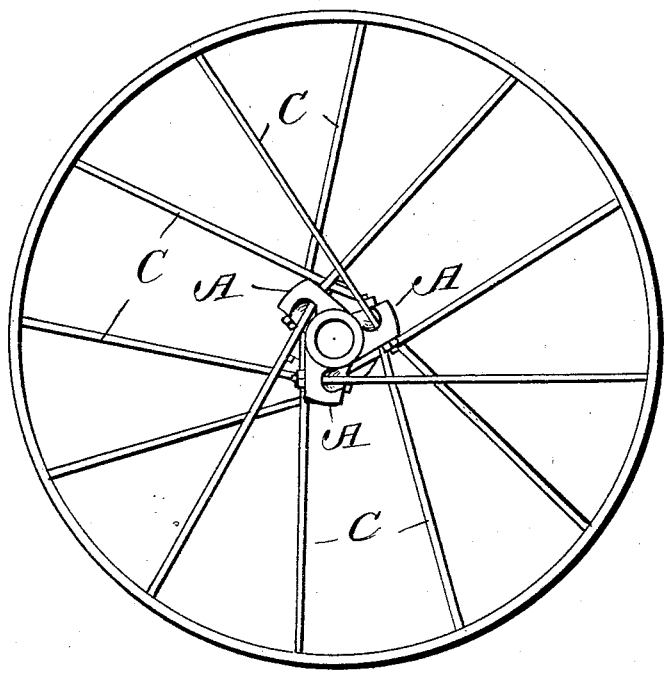
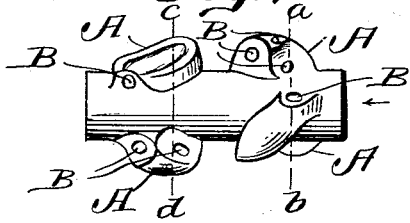
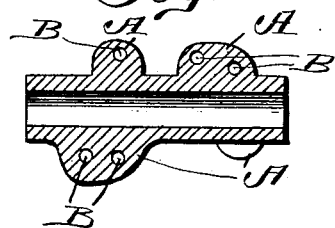
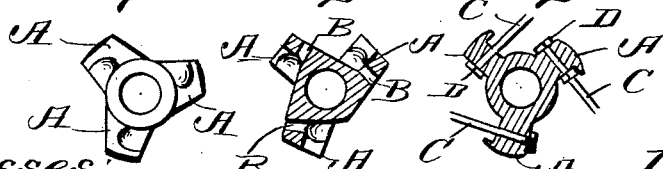
Witnesses:
C. D. Kesler
James L. Norris, Jr.
Inventor
Edmund P. Dignan
By James L. Norris
Atty.

No. 738,010. Patented September 1, 1903.

UNITED STATES PATENT OFFICE.

EDMUND PAUL DIGNAN, OF WILMINGTON, SOUTH AUSTRALIA, AUSTRALIA.

METAL WHEEL-NAVE.

SPECIFICATION forming part of Letters Patent No. 738,010, dated September 1, 1903.

Application filed December 28, 1901. Serial No. 87,630. (No model.)

*To all whom it may concern:*

Be it known that I, EDMUND PAUL DIGNAN, machinist, a subject of the King of Great Britain, residing at Wilmington, in the State of South Australia, in the Commonwealth of Australia, have invented certain new and useful Improvements in Metal Wheel-Naves for Suspension-Spokes, of which the following is a specification.

This invention relates to the construction of an improved wheel-nave of iron or steel or other suitable metal and is intended more particularly for the road-wheels of agricultural implements and other vehicular machinery.

The object of this invention is to construct a wheel-nave in such manner that spokes arranged tangentially to the hub may be tensioned by nuts at their hub ends. I accomplish this object by constructing a metal wheel-nave having a series of projections or bosses arranged around the periphery of the same and cast or formed integral therewith, each boss being provided with openings arranged tangential to the periphery of the hub, having flat surfaces at the ends of the said openings and at right angles to the same adapted to form seats for the spoke-nuts. In this way a wheel may be constructed in which tangent-spokes can be tensioned independently by nuts at their hub ends.

My invention will be the more clearly explained by reference to the accompanying drawings, in which—

Figure 1 is a side view of a wheel with my improved nave; Fig. 2, a longitudinal side view of the nave; Fig. 3, a longitudinal section of Fig. 2; Fig. 4, an end view of the nave; Fig. 5, a cross-section on the line *a b* of Fig. 2; Fig. 6, a cross-section on the line *c d* of Fig. 2.

By reference to the drawings it will be seen that the hub or body of the metal wheel-nave is constructed with a series of solid projections or bosses A, extending around its periphery. The projections or bosses A are cast or formed integral with the nave and are drilled or molded with spoke holes or openings for the spokes arranged tangential to the periphery of the nave. At the ends of the holes or openings B the bosses or projections A are provided with seats for the spoke-nuts at right angles to such holes or openings B. The spokes C are passed through the spoke-holes in the rim and then through the spoke holes or openings B in the projections or bosses A and are thus arranged tangentially to the hub and radiate from the nave to the rim of the wheel. Nuts are then screwed upon the spokes C against the seats on the bosses or projections A at the ends of the openings B. In this way each spoke can be tensioned independently by its nut at the hub end.

Having now particularly described and ascertained the nature of my said invention and in what manner the same is to be performed, I declare that what I claim is—

A hollow wheel-nave of the same diameter throughout provided throughout its periphery with a series of independent integral bosses extending at an inclination with respect to one another, each of said bosses provided with spoke-receiving openings arranged tangentially to the periphery of the nave and further provided with flat surfaces extending at right angles to the ends of the spoke-receiving openings to form seats for the spoke-nuts, substantially as herein shown and described.

In testimony whereof I have hereunto set my hand in presence of two subscribing witnesses.

EDMUND PAUL DIGNAN.

Witnesses:
EDWIN BLACKLER COLTON,
WILLIAM JARVIS.